US011949711B2

(12) United States Patent
Montoya

(10) Patent No.: US 11,949,711 B2
(45) Date of Patent: Apr. 2, 2024

(54) SYSTEMS AND METHODS FOR SECURING INFORMATION

(71) Applicant: CACI International Inc., Arlington, VA (US)

(72) Inventor: Ryan Montoya, Arvada, CO (US)

(73) Assignee: CACI International, Inc., Reston, VA (US)

( * ) Notice: Subject to any disclaimer, the term of this patent is extended or adjusted under 35 U.S.C. 154(b) by 659 days.

(21) Appl. No.: 16/504,926

(22) Filed: Jul. 8, 2019

(65) Prior Publication Data
US 2021/0014205 A1 Jan. 14, 2021

(51) Int. Cl.
*H04L 9/40* (2022.01)
*G06F 18/2411* (2023.01)
*G06N 3/04* (2023.01)
*G06V 10/764* (2022.01)
*G06V 10/774* (2022.01)
*G06V 10/776* (2022.01)

(52) U.S. Cl.
CPC ...... *H04L 63/1475* (2013.01); *G06F 18/2411* (2023.01); *G06N 3/04* (2013.01); *G06V 10/764* (2022.01); *G06V 10/774* (2022.01); *G06V 10/776* (2022.01); *H04L 63/0485* (2013.01); *H04L 63/18* (2013.01)

(58) Field of Classification Search
None
See application file for complete search history.

(56) References Cited

U.S. PATENT DOCUMENTS

| 6,550,012 | B1 | 4/2003 | Villa et al. |
| 7,784,099 | B2 | 8/2010 | Benjamin |
| 8,397,301 | B2 | 3/2013 | Hering et al. |
| 8,756,698 | B2 | 6/2014 | Sidagni |
| 8,769,684 | B2 | 7/2014 | Stolfo et al. |
| 9,465,582 | B1 * | 10/2016 | Whelan ............... H04L 9/3236 |
| 10,356,061 | B2 * | 7/2019 | Fiske ................. H04L 63/0435 |
| 10,402,172 | B1 * | 9/2019 | Mandich .............. H04L 9/0858 |

(Continued)

FOREIGN PATENT DOCUMENTS

| CN | 106302433 A | * | 1/2017 | ......... H04L 63/1408 |
| CN | 108345894 A | * | 7/2018 | ............. G06K 9/627 |
| WO | WO-2015128613 A1 | * | 9/2015 | ......... H04L 63/1408 |

OTHER PUBLICATIONS

Kelsey, John and McKay, Kerry and Turan, Meltem, Predictive Models for Min-Entropy Estimation, 2015, pp. 1-18, https://tsapps.nist.gov/publication/get_pdf.cfm?pub_id=918415 (Year: 2015).*

(Continued)

*Primary Examiner* — Saleh Najjar
*Assistant Examiner* — Shadi H Kobrosli
(74) *Attorney, Agent, or Firm* — BakerHostetler

(57) ABSTRACT

A system may be configured to prepare and use prediction models for predicting existence of fingerprints among encrypted traffic. Some embodiments may: obtain a machine learner configured to identify statistical differences between pseudo-randomness associated with encrypted user data and higher-entropy randomness associated with a set of other data; determine at least a portion of a path traversed by the encrypted user data in the network based on the identification; and secure the network based on the determination.

9 Claims, 6 Drawing Sheets

(56) References Cited

U.S. PATENT DOCUMENTS

| | | | | |
|---|---|---|---|---|
| 2003/0149869 A1* | 8/2003 | Gleichauf | ............... | H04L 63/18 713/153 |
| 2003/0200439 A1* | 10/2003 | Moskowitz | ......... | H04L 63/1408 713/181 |
| 2005/0198505 A1* | 9/2005 | Smith | ............... | H04N 1/32149 713/168 |
| 2005/0234728 A1* | 10/2005 | Tachibana | ............ | G10L 19/097 704/273 |
| 2010/0211787 A1* | 8/2010 | Bukshpun | ................. | H04L 9/14 380/255 |
| 2013/0136255 A1* | 5/2013 | Brown | ................. | H04L 9/0869 380/28 |
| 2017/0034167 A1* | 2/2017 | Figueira | ................ | H04L 63/061 |
| 2017/0104596 A1* | 4/2017 | Herrero | ................... | H04L 9/065 |
| 2018/0052662 A1* | 2/2018 | Dale | ........................ | G06F 7/58 |
| 2018/0115567 A1* | 4/2018 | El-Moussa | .......... | H04L 63/1416 |
| 2018/0197089 A1* | 7/2018 | Krasser | ................. | G06N 20/10 |
| 2018/0241557 A1* | 8/2018 | Maes | .................... | H04L 9/0866 |
| 2019/0044954 A1* | 2/2019 | Kounavis | .............. | H04L 9/0631 |
| 2019/0250889 A1* | 8/2019 | Brandao | ............... | H04L 9/0662 |
| 2019/0273510 A1* | 9/2019 | Elkind | ................... | G06N 20/00 |
| 2019/0287204 A1* | 9/2019 | Kakkirala | ............ | G06T 1/0042 |
| 2019/0347418 A1* | 11/2019 | Strogov | ................. | G06F 21/44 |
| 2019/0394171 A1* | 12/2019 | Kaman | ................. | H04L 9/0662 |
| 2020/0050760 A1* | 2/2020 | El-Moussa | ........... | H04L 63/145 |
| 2020/0167665 A1* | 5/2020 | Li | .......................... | G06N 5/003 |
| 2020/0186331 A1* | 6/2020 | Thompson | ........... | H04L 9/0656 |
| 2020/0320214 A1* | 10/2020 | Harris | ................. | H04L 63/1475 |
| 2020/0396062 A1* | 12/2020 | Enyedi | ................. | H04L 9/0869 |

OTHER PUBLICATIONS

William A. R. de Souza et al., "A distinguishing attack with a neural network" 2013 IEEE 13th International Conference on Data Mining Workshops, 2013, pp. 154-161.

* cited by examiner ns and METHODS FOR SECURING INFORMATION

TECHNICAL FIELD

The present disclosure relates generally to systems and methods for information security. More particularly, disclosed embodiments exploit pseudo-randomness of any encryption scheme to evaluate and/or monitor secrecy of a channel or network.

BACKGROUND

Technology is becoming increasingly network oriented, necessitating the use of robust and secure encryption to protect against data theft by attacking third-parties. Underlying most encryption algorithms are the principles of entropy and randomness, the algorithms being most successful if they completely obfuscate plaintext information via generated keystreams. As such, attackers are not supposed to gain any information about the plaintext information by observing the resultant ciphertext. These generated keystreams are often based on a pseudo-random number generator (PRNG), pseudo-randomness being applied because higher entropy randomness is not computationally efficient (e.g., in transmitting large volumes of data at high data rates) Encryption algorithms based on PRNGs are thus susceptible to nefarious and undesirable exploits, creating a need for flexible traffic detection with respect to movement of secret information.

SUMMARY

Systems and methods are disclosed for performing cybersecurity, e.g., by fingerprinting data and/or by obtaining a machine learner configured to identify statistical differences between pseudo-randomness associated with encrypted user data and higher-entropy randomness associated with a set of other data (e.g., the fingerprint), determining at least a portion of a path traversed by the encrypted user data in a network based on the identification, and securing the network based on the determination. The method is implemented by one or more hardware processors configured by machine-readable instructions and/or other components.

Yet another aspect of the present disclosure relates to a system configured for generating and detecting high-entropy data from among plaintext data that is encrypted using pseudo-random numbers. The system comprises one or more processors and other components or media, e.g., upon which machine-readable instructions may be executed to obtain a machine learner configured to identify statistical differences between pseudo-randomness associated with encrypted user data and higher-entropy randomness associated with a set of other data, determining at least a portion of a path traversed by the encrypted user data in a network based on the identification, and securing the network based on the determination. Implementations of any of the described techniques may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Other features will be apparent from the following description, including the drawings and claims. The drawings, though, are for the purposes of illustration and description only and are not intended as a definition of the limits of the disclosure. Like reference numerals may refer to like elements throughout the specification.

DETAILED DESCRIPTION

As used throughout this application, the word "may" is used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

Figure 1:
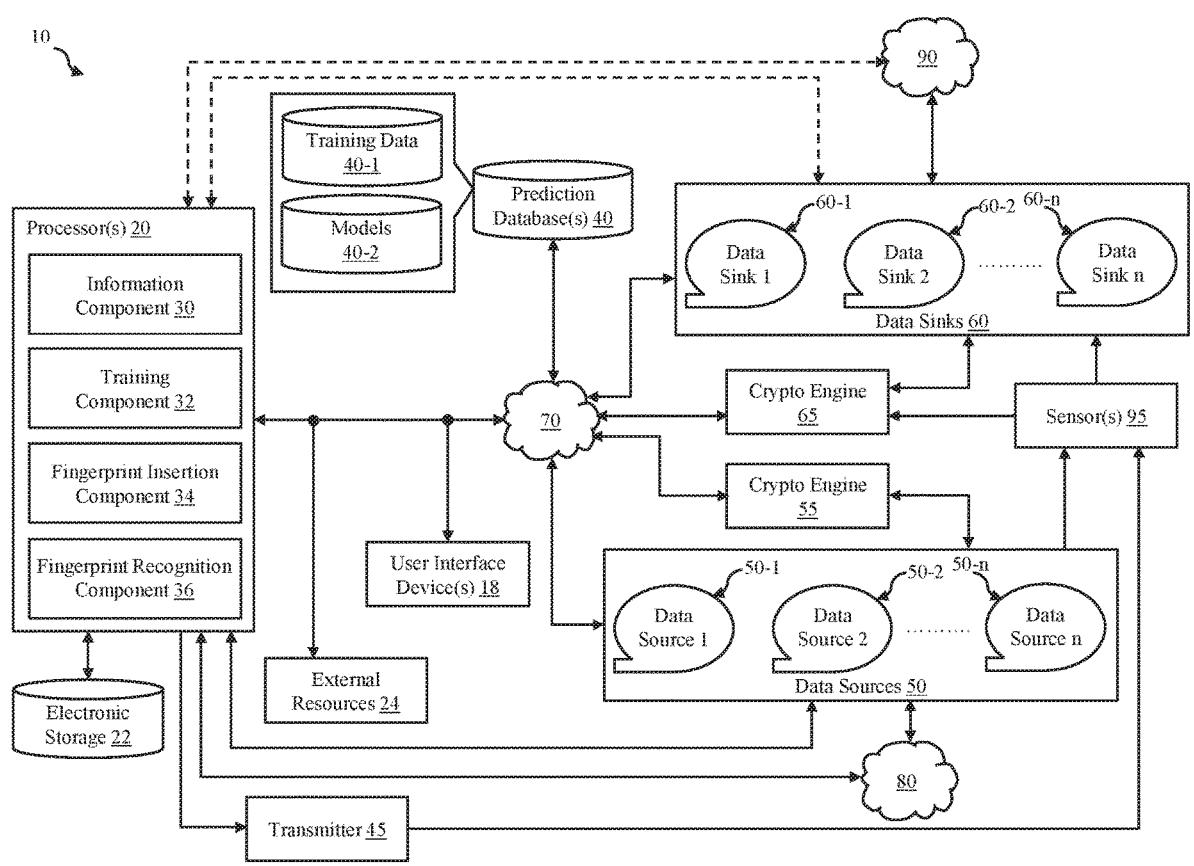
FIG. 1 illustrates an example of a system in which certain cryptographic vulnerabilities are exploited for securing data or a network, in accordance with one or more embodiments.

Presently disclosed are ways of classifying network data. FIG. 1 illustrates system 10 configured to prepare and use one or more prediction models that predict presence of a particular set or type of data in the face of use of any pseudo-random number generator (PRNG). Some embodiments of system 10 may thus observe a weakness from among use of many or most known encryption standards or schemes. And some embodiments of fingerprinting secure secret channels by at least exposing network traffic via such use. Some embodiments are implemented vis-à-vis any encryption standard and any plaintext data format. System 10 may be configured to receive encrypted traffic and perform subsequent processing. Some disclosed embodiments of system 10 may secure secret, pre-encrypted information of any channel in any network, including those in which movements of the encrypted secret information cannot otherwise be distinguished despite full visibility of data traversing the network.

Encryption standards that use PRNGs, such as the universal mobile telecommunications system (UMTS) and the 3GPP long term evolution (LTE) standards and in schemes using the advanced encryption standard (AES) algorithm, suffer from the fundamental weakness of being of non-maximum entropy (i.e., having statistical determinism). But known, statistical approaches cannot exploit this weakness due at least to the heavy computational burden. Some embodiments may secure an encrypted channel using machine-learning techniques. More specifically, disclosed embodiments may trace the presence of high-entropy information (i.e., a fingerprint) in any communication system, e.g., practically regardless of the encryption algorithm used to obfuscate it.

Disclosed embodiments leverage one of the main aspects of encryption, and they are therefore flexible. Some implementations of the disclosed approach may be applied to any controllable and/or observable channel. For example, fingerprint insertion component 34 (of processor 20 depicted in FIG. 1) may generate an infrared pattern or noise such that fingerprint recognition component 36 (e.g., of a same or different processor 20) may subsequently detect if secret information is being captured by a sensor (e.g., video camera). Similarly, in another example, fingerprint insertion component 34 may generate a fingerprint (e.g., pattern or noise) in an RF communication channel, and fingerprint recognition component 36 may then detect if that channel is being illicitly observed and relayed. In another example, fingerprint insertion and detection may similarly be employed to test information security of an Internet of things (IoT) device. The disclosed approach may be further exemplified to mitigate the loss and movement of sensitive information and/or to vet an environment or channel for its security against unwanted intruders.

An artificial neural network is a computational model that may, in some embodiments, be configured to determine and detect high-entropy information. This information is referred to herein as a fingerprint, but it can also be referred to as a watermark, signature, or other pattern. In some embodiments, this high-entropy information may be a particular series of bits. For example, a fingerprint may be a predetermined sequence of bits or characters, or it may be generated using a function (e.g., a hash-like function) of the predetermined sequence of bits or characters. In some embodiments, fingerprints of this disclosure exhibit maximum randomness, e.g., chosen from a truly random uniform distribution and/or precomputed such that their entropy is greater-than or equal-to the entropy of the cipher.

An artificial neural network is a network or circuit of artificial neurons or nodes for solving artificial intelligence (AI) problems by operating as learning algorithms that model the input-output relationship. Such artificial networks may be used for predictive modeling. The prediction models may be and/or include one or more neural networks (e.g., deep neural networks, artificial neural networks, or other neural networks), other machine learning models, or other prediction models. As an example; the neural networks referred to variously herein may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections may be enforcing or inhibitory, in their effect on the activation state of connected neural units. These neural network systems may be self-learning and trained, rather than explicitly programmed, and can perform significantly better in certain areas of problem solving, as compared to humans and traditional computer programs. In some embodiments, neural networks may include multiple layers (e.g., where a signal path traverses from input layers to output layers). In some embodiments, back propagation techniques may be utilized to train the neural networks, where forward stimulation is used to reset weights on the "front" neural units. In some embodiments, stimulation and inhibition for neural networks may be more free-flowing, with connections interacting in a more chaotic and complex fashion.

Disclosed implementations of artificial neural networks may apply a weight and transform the input data by applying a function, this transformation being a neural layer. The function may be linear or, more preferably, a nonlinear activation function, such as a logistic sigmoid, Tan h, or rectified linear activation function (ReLU) function, Intermediate outputs of one layer may be used as the input into a next layer. The neural network through repeated transformations learns multiple layers that may be combined into a final layer that makes predictions. This learning (i.e., training) may be performed by varying weights or parameters to minimize the difference between the predictions and expected values. In some embodiments, information may be fed forward from one layer to the next. In these or other embodiments, the neural network may have memory or feedback loops that form, e.g., an RNN. Some embodiments may adjust millions or even billions of parameters via back-propagation.

In some embodiments, a convolutional neural network (CNN) may be used. A CNN is a sequence of hidden layers, such as convolutional layers interspersed with activation functions. Typical layers of a CNN are thus a convolutional layer, an activation layer, batch normalization, and a pooling layer. Each output from one of these layers is an input for a next layer in the stack, the next layer being, e.g., another one of the same layer or a different layer. For example, a CNN may have two sequential convolutional layers. In another example, a pooling layer (e.g., maximum pooling, average pooling, etc.) may follow a convolutional layer. When many hidden, convolutional layers are combined, this is called deep stacking.

Some embodiments may implement specific machine-learning algorithms to a level acceptable for a particular application. For example, some embodiments of fingerprint recognition component 36 (of processor 20 depicted in FIG. 1) may identify fingerprints with a high level of accuracy notwithstanding the pseudo-random encryption algorithm and the channel that are used. In this or other examples, fingerprint recognition component 36 comprises a machine-learner that is well-trained to detect large fingerprints. The machine-learner may be a (e.g., binary) classifier that implements at least one of a naïve-Bayes classifier, self-organizing maps, clustering analysis, support vector machine (SVM), linear discriminant analysis, time frequency pattern analysis, singular value decomposition (SVD), artificial neural network, deep neural network (INN), recurrent neural network (RNN), convolutional neural network (CNN), hidden Markov model (HMM), and Bayesian network (BN). As such, the architecture of the classifier may be shallow or deep.

The randomness of a keystream used in a given cryptographic environment is capable of masking the information of plaintext, but only if the entropy of the keystream is greater than the entropy of the plaintext. If the opposite is true, the information of the plaintext can leak or be observed in the ciphertext due to statistically observable deviations in the biases or randomness intrinsic to the encryption scheme. By design, a cipher typically does not propagate any information in the ciphertext that can reveal details about the plaintext, the cryptographic key used, or the cipher that encrypted the plaintext. In some embodiments, an amount of entropy of the higher-entropy data set is substantially the same as or greater than an amount of entropy of pseudo-random data. In other words, some embodiments generate and/or use a fingerprint that has same or higher entropy than a set of ciphertext. For example, some embodiments may detect leaked information.

As used herein, a channel may be any medium via which information is sent and/or received. Some examples include acoustic, cellular, network, visual, or channels of different media. Though encryption may be employed to protect information traversing a channel, there are some channels that cannot be easily encrypted. For example, in a secret meeting held in a conference room, there is no simple way to encrypt the acoustic channel (e.g., spoken words) or any displayed content. The meeting room could be compromised with a device (e.g., combination of microphone and wireless transceiver) that is actively transmitting, via a covert channel, the meeting's auditory information. This covert channel breaking the secrecy may be encrypted, obscuring the fact that it is violating the meeting room's security. But this is just one example problem, as this disclosure contemplates protecting data transferred via any communication media.

In many cases, the channels via which critical information is stolen can be directly, observed. For example, it might be transmitted wirelessly or through the secret entity's own network (e.g., at least initially, by a rogue insider). But if those channels were encrypted, it would not be possible to accurately identify if sensitive information was being stolen through them.

None of the connections or arrows shown in FIG. 1 necessarily exist in all possible implementations of the disclosed innovation. For example, processor 20 in FIG. 1 is shown to interface, via dotted arrows, with data sink 60 directly and indirectly via network 90. These dotted arrows merely depict some possible ways that processor 20 can get access to the encrypted data of disclosed embodiments. Similarly, processor 20 is shown, in two different connections, to interface with data source 50. A first of these may be a direct connection (e.g., via USB associated with external resources 24) and the other connection may be indirectly via network 80. As such, these connections are not intended to be limiting and are merely depicted exemplarily.

In some embodiments, each of data sources 50 (e.g., data source 50-1, data source 50-2, and/or data source 50-n, n being any natural number) is a human person or belongs to a database, a communications message, a user device, a consumer electronics device, a mobile phone, a smartphone, a personal data assistant, a digital tablet/pad computer, a wearable device, a personal computer, a laptop computer, a notebook computer, a work station, a server, a high performance computer (HPC), a vehicle computer, a game or entertainment system, a set-top-box, or any other device, in some embodiments, each of data sinks 60 (e.g., data sink 60-1, data sink 60-2, and/or data sink 60-n, n being any natural number) belongs to a database, a communications message, a user device, a consumer electronics device, a mobile phone, a smartphone, a personal data assistant, a digital tablet/pad computer, a wearable device, a personal computer, a laptop computer, a notebook computer, a work station, a server, an HPC, a vehicle computer, a game or entertainment system, a set-top-box, or any other device.

In some embodiments, data sources 50 may be in a meeting space. The meeting space may be sensed by one or more sensors 95. For example, one or more covert microphones and/or one or more covert cameras may be used by an attacker. Some disclosed embodiments may therefore determine that data traversing a network was captured by these sensor(s) due to pre-injection of fingerprint(s).

In the case of meetings during which secret information is exchanged visually and acoustically, the meeting room's security may be validated by initially placing a pattern or noise generating source in the room. In some embodiments, transmitter 45 may emit a predetermined pattern or fingerprint as audio (e.g., ultrasonic noise) or visually (e.g., laser, infrared radiation, or in another portion of electromagnetic spectrum) into a conversation or presentation taking place in a meeting space. Afterwards, communication paths (e.g., network data or RF transmissions) may be snooped to observe the presence of the pattern or the noise. When these observations are not made, the information exchanged in that room may be deemed sufficiently secure. As such, if the data originating from a point in an adversarial channel is influenced by a high entropy fingerprint, it is possible to track the flow of information from that point further down the channel or even down in a different channel (e.g., network) altogether. Some embodiments may thus identify adversarial devices that consume sensitive information.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk (hive, etc.). Electronic storage 22 may be (in whole or in part) a separate component within system 10, or electronic storage 22 may be provided (in whole or in part) integrally with one or more other components of system 10 (e.g., a user interface device 18, processor 20, etc.). In some embodiments, electronic storage 22 may be located in a server together with processor 20, in a server that is part of external resources 24, in user interface devices 18, and/or in other locations. Electronic storage 22 may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 20, information received via user interface devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network, electronic storage, equipment related to Wi-Fi technology, equipment related to Bluetooth® technology, data entry devices, a power supply, a transmit/receive element (e.g., an antenna configured to transmit and/or receive wireless signals), a network interface controller (NIC), a display controller, a graphics processing unit (GPU), a radio (e.g., a software-defined radio), and/or other resources. In some implementations, some or all of the functionality attributed herein to external resources 24 may be provided by other components or resources included in system 10. Processor 20, external resources 24, user interface device 18, electronic storage 22, network 70, network 80, network 90, and/or other components of system 10 may be configured to communicate with each other via wired and/or wireless connections, such as a network (e.g., a local area network (LAN), the Internet, a wide area network (WAN), a radio access network (RAN), a public switched telephone network (PSTN)), cellular technology (e.g., GSM, UMTS, LTE, 5G, etc.), Wi-Fi technology, another wireless communications link (e.g., radio frequency (RF), microwave, infrared (IR), ultraviolet (UV), visible light, cmWave, mmWave, etc.)), a base station, and/or other resources.

User interface device(s) 18 of system 10 may be configured to provide an interface between one or more users and system 10. User interface devices 18 are configured to provide information to and/or receive information from the one or more users. User interface devices 18 include a user interface and/or other components. The user interface may be and/or include a graphical user interface configured to present views and/or fields configured to receive entry and/or selection with respect to particular functionality of system 10, and/or provide and/or receive other information. In some embodiments, the user interface of user interface devices 18 may include a plurality of separate interfaces associated with processors 20 and/or other components of system 10. Examples of interface devices suitable for inclusion in user interface device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 18 include a removable storage interface. In this example, information may be loaded into user interface devices 18 from removable storage (e.g., a smart card, a flash drive, a removable disk) that enables users to customize the implementation of user interface devices 18.

In some embodiments, user interface devices 18 are configured to provide a user interface, processing capabilities, databases, and/or electronic storage to system 10. As such, user interface devices 18 may include processors 20, electronic storage 22, external resources 24, and/or other components of system 10. In some embodiments, user interface devices 18 are connected to a network (e.g., the Internet). In some embodiments, user interface devices 18 do not include processor 20, electronic storage 22, external resources 24, and/or other components of system 10, but instead communicate with these components via dedicated lines, a bus, a switch, network, or other communication means. The communication may be wireless or wired. In some embodiments, user interface devices 18 are laptops, desktop computers, smartphones, tablet computers, and/or other user interface devices.

Data and content may be exchanged between the various components of the system 10 through a communication interface and communication paths using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6).

Networks 80 and 90 depicted in FIG. 1 may each be of any suitable type and implement any suitable protocol such that processors 20 may gain access (e.g., directly or indirectly) to data traversing the network.

In some embodiments, processor 20 may belong to a user device, a consumer electronics device, a mobile phone, a smartphone, a personal data assistant, a digital tablet/pad computer, a wearable device, a personal computer, a laptop computer, a notebook computer, a work station, a server, an HPC, a vehicle computer, a game or entertainment system, a set-top-box or any other device. As such, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, user interface devices 18, devices that are part of external resources 24, electronic storage 22, and/or other devices).

As shown in FIG. 1, processor 20 is configured via machine-readable instructions to execute one or more computer program components. The computer program components may comprise one or more of information component 30, training component 32, fingerprint insertion component 34, fingerprint recognition component 36, and/or other components. Processor 20 may be configured to execute components 30, 32, 34, and/or 36 by: software; hardware; firmware; some combination of software, hardware, and/or firmware; and/or other mechanisms for configuring processing capabilities on processor 20. In some embodiments, processor 20 comprises one or more GPUs, at least a single GPU being used for inference deployment of a model (e.g., including when the model is a neural network model).

It should be appreciated that although components 30, 32, 34, and 36 are illustrated in FIG. 1 as being co-located within a single processing unit, in embodiments in which processor 20 comprises multiple processing units, one or more of components 30, 32, 34, and/or 36 may be located remotely from the other components. For example, in some embodiments, each of processor components 30, 32, 34, and 36 may comprise a separate and distinct set of processors. The description of the functionality provided by the different components 30; 32, 34, and/or 36 described below is for illustrative purposes, and is not intended to be limiting, as any of components 30, 32, 34, and/or 36 may provide more or less functionality than is described. For example, one or more of components 30, 32, 34, and/or 36 may be eliminated, and some or all of its functionality may be provided by other components 30, 32, 34, and/or 36. As another example, processor 20 may be configured to execute one or more additional components that may perform some or all of the functionality attributed below to one of components 30, 32, 34, and/or 36.

In some embodiments; information component 30 may obtain plaintext having entropy equal to or less than typical plaintext in a given application. For example, if a monitored channel is transmitting video, information component 30 may obtain video stream(s) of a database as plaintext.

In some embodiments, information component 30 may obtain training data 40-1 that includes pre-generated fingerprints. In some embodiments, information component 30 may obtain a dataset. The obtained dataset may comprise data encrypted by any algorithm that uses a PRNG or that generates pseudo-random ciphertext.

In some embodiments, information component 30 may obtain plaintext into which fingerprint insertion component 34 inserts a fingerprint. For example, fingerprint insertion component 34 may combine the obtained plaintext with the fingerprint locally, or this component may output the fingerprint (e.g., directly or via network 80) to data source 50 for subsequent encryption. In some implementations, fingerprint insertion component 34 performs the encryption locally before forwarding the encrypted data to a network (e.g., network 70).

In some embodiments, training component 32 may generate and/or obtain training data 40-1 by encrypting the plaintext obtained by information component 30. In some embodiments, training component 32 may generate and/or obtain training data 40-1 by further encrypting the fingerprint (e.g., after the fingerprint is combined with the plaintext). That is, different implementations may require the plaintext and the fingerprint to be combined before or after encryption. For example, training component 32 may use training data 40-1 that has had fingerprint(s) inserted via an XOR operation into a string of ciphertext, e.g., from a stream cipher.

In some embodiments, training component 32 may, prior to training, divide or split encrypted training data 40-1 into a training dataset and a validation dataset, the subsequent training only be applied to the training dataset. Training component 32 may then train machine-learning models to learn relevant features of encrypted data and to learn a classification based on the features, an encryption algorithm being used in some embodiments as a label into the classifier.

Training component 32 may prepare one or more prediction models to predict existence of fingerprints in encrypted traffic. In some embodiments, prediction model 40-2 may analyze its predictions against a reference set of data called the validation set. In some use cases, the reference outputs may be provided as input to the prediction models, which the prediction model may utilize to determine whether its predictions are accurate, to determine the level of accuracy or completeness with respect to the validation set data, or to make other determinations. Such determinations may be utilized by the prediction models to improve the accuracy or completeness of their predictions. In another use case, accuracy or completeness indications with respect to the prediction models' predictions may be provided to the prediction model, which, in turn, may utilize the accuracy or completeness indications to improve the accuracy or completeness of its predictions with respect to input encrypted data. For example, a labeled training set may enable model improvement. That is, the training model may use a training set of data to iterate over model parameters until the point where it arrives at a final set of parameters/weights to use in the model.

Prediction models 40-2 (e.g., implementing a neural network) may be trained using training data 40-1 obtained by information component 30 from prediction storage/database 40 (or from data source 50, electronic storage 22, external resources 24, and/or via user interface device(s) 18). This training data may comprise megabytes, gigabytes, or even terabytes of data. For example, training data 40-1 may comprise encrypted data that has fingerprints and comprise encrypted data that does not have fingerprints. The validation set may be a subset of training data 40-1, which is kept hidden from the model to test accuracy of the model. The test set may be a dataset, which is new to the model to test accuracy of the model.

As mentioned, training component 32 may enable one or more prediction models to be trained. The training may be performed via several iterations. For each training iteration, a classification prediction may be determined and compared to the corresponding, known classification. For example, known encrypted data that comprises a fingerprint may be input, during the training or validation, into the neural network to determine whether the prediction model can properly predict its presence in the encrypted data. As such, the neural network is configured to receive at least a portion of the training data as an input feature space. Once trained, model(s) 40-2 may be stored, as shown in FIG. 1, and then used subsequently with real network traffic.

In some embodiments, training component 32 may apply a particular training algorithm to a machine-learning model that depends on a choice of the machine-learning model. During the training, training component 32 may use a labelled dataset to train both automatic feature extraction and classification. Preprocessing will also depend on the choice of machine-learning classifier. For example, if a CNN binary classifier is used, the output layer of the network will produce a one-hot encoded vector describing the confidence as to whether the input sample does or does not contain the fingerprint. Backpropagation may then be applied to the truth labels provided by the dataset, i.e., to train the network. Some embodiments may choose an optimizer on a per application basis.

Some embodiments may multiply pass the training data forwards and backwards. Once trained, the neural network may make predictions or inferences when fed input data. Some embodiments may implement artificial neural networks with one or more GPUs. And this is at least because neural networks are created from large numbers of identical neurons that are configured in parallel. This parallelism maps well to GPUs, which provide a significant computation speed-up over CPU-only training. As such, embodiments that include use of GPU(s) may enable closer to real-time capabilities of fingerprint detection.

In some embodiments, fingerprint insertion component 34 may add a high-entropy fingerprint before or during a communication to trace the flow of that information in a network, even if that network were secured by encryption. Some embodiments of fingerprint insertion component 34 may utilize this fingerprint in an active manner. For example, active exploitation may be when one or more fingerprints are intentionally injected into a channel, e.g., at various nodes in a communication network. In this or another example, fingerprint insertion component 34 may secure data via a man-in-the-middle insertion of one or more fingerprints. In some embodiments, fingerprint insertion component 34 may thus place the fingerprint in proximity to data (e.g., by tagging the data) desirable of securing. For example, fingerprint insertion component 34 may modify original data at some node in a network or at some upstream point in a communication path.

In some embodiments, fingerprint insertion component 34 may determine hyperparameters (e.g., which guide application of training data 40-1, such as a number of hidden units or layers) based on a number of bits of the plaintext and/or on a number of bits of the fingerprint, being thus application specific. Fingerprint insertion component 34 may preferably select short fingerprints so as to not impose a communications overhead or burden. But this selection may be based on desired levels of detectability and on the strength of the encryption algorithm used. In some embodiments, fingerprint insertion component 34 may determine sizes of fingerprints that are on the order of kilobytes (KBs), but this is not intended to be limiting as smaller fingerprints on the order of dozens or hundreds of bytes are contemplated as are larger fingerprints on the order of megabytes (MBs). Larger fingerprints may generally imply easier identification in a downstream network, and smaller fingerprints may generally imply better performance (i.e., from an operational or practical standpoint).

In some embodiments, fingerprint insertion component 34 may generate a high entropy fingerprint. In some embodiments, the high entropy fingerprint is known. In other embodiments, the high entropy fingerprint is only detectable by its level of entropy as compared to other data in an observed communication (i.e., even if the communication is encrypted). In some embodiments, the communication is encrypted by data source 50 (e.g., via crypto engine 55). In other embodiments, the communication is encrypted by data sink 60 (e.g., via crypto engine 65).

In some embodiments, the fingerprint is a single pattern that is of high entropy. In other embodiments, there are multiple, different fingerprints used each of which is of high entropy. A truly random fingerprint may be collected from a real-world, random process, such as from thermal noise via a hardware device. In some embodiments, fingerprint insertion component 34 may concatenate or otherwise insert a fingerprint into a set or stream of user plaintext prior to encryption. Fingerprint insertion component 34 may perform the fingerprint insertion by first intercepting live plain text or ciphertext traffic. For example, such high-entropy data is interspersed or injected once or several times (e.g., periodically, irregularly, or on-demand by a user) among the user data.

In some embodiments, fingerprint insertion component 34 may inject high-entropy fingerprints at various nodes of the network, if greater knowledge of nefarious use of a network is desired. For example, some embodiments of fingerprint recognition component 36 may monitor movements of these fingerprints, even if the fingerprints are encrypted. A resulting map may be generated to describe a topology of a communications network, such as used routing and endpoint connections. Some embodiments of fingerprint recognition component 36 may thus analyze endpoint connections and generate node-node communication statistics. In some embodiments, fingerprint recognition component 36 may determine a route (e.g., statically or dynamically determined) taken by encrypted user data.

In some embodiments, fingerprint insertion component 34 may add a fingerprint file in one or more folders of a directory tree of files containing sensitive data. In some embodiments, fingerprint insertion component 34 may append a fingerprint to an existing, sensitive file.

In some embodiments, fingerprint insertion component 34 may perform fingerprint insertion via malleability of the secure channel plaintext. For example, in the case of stream cipher encryption, like Kasumi in UNITS, it is possible to directly influence the plaintext using fingerprint(s) without violating header or control information. But this is not intended to be limiting as the disclosed approach may be applied to block ciphering encryption schemes like AES.

In some embodiments, fingerprint insertion component 34 may add a fingerprint after a communication has already been encrypted, e.g., if a location of the communicated data within a channel is distinguishable from its metadata. For example, fingerprint insertion component 34 may add a fingerprint to an encrypted communication, such as end-to-end public key encryption and in stream ciphering. By XOR'ing, appending, or otherwise injecting the high-entropy fingerprint into the user data, the message can be detected in a downstream network via passive monitoring of any accessible channel. An advantage of XOR'ing or inserting a high-entropy fingerprint into the message data over nullifying or otherwise modifying the encrypted data for more distinguishable identification is that the entropy-fingerprint is more difficult to distinguish from true encrypted plaintext, and therefore the fingerprinted message is less detectable by a third party observer before it is decrypted at an endpoint.

In some embodiments, fingerprint insertion component 34 may use a random number generator that generates fingerprints with greater-than or equal-to entropy than the encryption scheme used to encrypt the plaintext. For example, fingerprint insertion component 34 may use a hardware-based random-number generator.

In some embodiments, fingerprint insertion component 34 may apply entropy fingerprinting to identify information leakage even in encryption-protected communication networks. The existence of high entropy data is observable, e.g., among pseudo-random encryption schemes. Inserting an entropy-fingerprint into secret data facilitates the identification of an insecure channel by searching for the presence of the entropy-fingerprint in this or one or more other observable channels. Some embodiments of fingerprint insertion component 34 and some embodiments of fingerprint recognition component 36 may employ machine learning methods to make and detect, respectively, distinctions among any pseudo-random encryption scheme. For example, some embodiments of fingerprint recognition component 36 may observe high entropy fingerprints from among communicated ciphertext.

Some embodiments of fingerprint recognition component 36 may identify end-to-end channel communication by monitoring network movements of specific encrypted data (e.g., including where the source and destination fields of a header cannot be determined from the message).

In some embodiments, fingerprint recognition component 36 exploits the insertion of very high entropy data into data of a lower level of entropy to identify network traffic, such as point-to-point user communication. For example, some embodiments may determine a path taken of certain, encrypted data. The disclosed approach improves upon known security techniques, since data is otherwise imperceptible once encrypted and thus nearly impossible to track its movement in one or more networks. In these or other embodiments, fingerprint recognition component 36 may be used to detect a breach in the secrecy of a generic communication channel. For example, upon tracking encrypted data taking unintended paths over the Internet to a nefarious destination (e.g., data sink 60), an owner of that data (e.g., data source 50) may assume that the encrypted data is being illicitly decrypted.

In some implementations, the data owner or a trusted affiliate of the owner may be alerted that their chosen channel was not truly secret (e.g., information is being undesirably leaked or actively stolen). As such, some embodiments of fingerprint detection component 36 may generate an alert if a fingerprint is detected in a communication that is not authorized by an owner of the data that encompasses the fingerprint. Fingerprint detection component 36 may instead or additionally close a channel via which the illicit communication takes place to prevent further information theft.

In some embodiments, fingerprint recognition component 36 may detect an embedded fingerprint whether the fingerprint is detected to be embedded in a communications packet or message and/or detected to be embedded in a directory tree of computer files. For example, fingerprint recognition component 36 may detect an attacker transferring the directory over an observable channel (e.g., Wi-Fi, Bluetooth, cellular, or another network). As depicted in FIG. 1, processor 20 may monitor or otherwise gain access to encrypted traffic in networks 70, 80, and/or 90.

Some embodiments of fingerprint recognition component 36 may trace at least a portion of an entire communication route (e.g., from end to end) by identifying movements of fingerprinted information in the network. In one example, this component may evaluate security vulnerabilities with respect to data source 50 (e.g., an IoT or other network-connected device). Some embodiments of fingerprint recognition component 36 may thus accurately identify point-to-point and/or point-to-multipoint communication, when the communication is encrypted (e.g., by a party different from the one from which data originates). For example, some embodiments of fingerprint recognition component 36 may analyze supposedly secure communication and identify a particular data traffic topology and/or at least a portion of a route taken in the communication. As such, some embodiments of fingerprint recognition component 36 may detect unexpected or unwanted communication paths, such as over network 70. In these or other embodiments, fingerprint recognition component 36 may further detect unexpected or unwanted communication paths, such as by accessing an attacker's channel (e.g., data sink 60 or network 90) as depicted with the dotted arrow(s) of FIG. 1.

Some embodiments of fingerprint recognition component 36 may secure any communication channel. For example, the channel may comprise a secret, software meeting detectable with a high amount of accuracy, via injection of high entropy plaintext. In this or another example, fingerprint recognition component 36 may test if information shared privately in a meeting is being surveilled, e.g., by audio or video sensor 95. Some embodiments of fingerprint recognition component 36 may identify security vulnerabilities in a space, place, or network. For example, fingerprint recognition component 36 may make an aspect of attacking channels visible and determine information about a route taken by an attacker. Some embodiments of fingerprint recognition component 36 may thus observe if sensitive data (whether encrypted or not by an attacker) is being exported via a data owner's own channels or via another communication path.

In some embodiments, fingerprint recognition component 36 may perform fingerprint recognition by quantifying the entropy of observed data traffic. Some embodiments of fingerprint recognition component 36 may therefore perform via knowledge of only the randomness of the channels, this performance being in some implementations agnostic of the actual information content and/or communications protocol. Fingerprint recognition component 36 may thus depend on ability of fingerprint insertion component 34 to inject or influence the secret plaintext, as low-entropy plaintext is not likely to be observable in the resulting ciphertext. Accordingly, fingerprint recognition component 36 may accurately detect the high entropy of the fingerprint (whether added to the plaintext before encryption or after encryption of the plaintext) in the encrypted channel. Some embodiments of fingerprint recognition component 36 may perform this detection by passing the encrypted traffic (or a copy of the encrypted traffic) through machine-learning algorithms to observe high-entropy data as distinct from pseudo-random data. Some embodiments of fingerprint recognition component 36 may use a neural network to quantify the quality of the randomness accurately. Quality of the randomness is quantified by the neural networks ability to distinguish between the random fingerprint and pseudo-random encrypted data.

Some embodiments of fingerprint recognition component 36 may employ a machine-learning algorithm to determine, given a sample of ciphertext, if a fingerprint or a modification (e.g., encryption) of the fingerprint exists in the sample. Side-channel information (e.g., information gained from the implementation of system 10) may be utilized, as available per application. For example, if the power consumption or electromagnetic radiation of a suspected networking device or sensor can be monitored, this may be used to assist in the detection of the high-entropy fingerprint through that device.

Supplementary information concerning the encryption algorithm may also be utilized, as available per application. For example, if an encryption algorithm is known or if the method is reduceable to a set of possible algorithms, this knowledge may be used to select the appropriate machine-learning classifier and/or used as supplementary information in the machine learning classifier. That is, for a given application, fingerprint recognition component 36 may utilize supplementary or side-channel information to select an appropriate classification strategy. For example, if a channel is encrypted with an RC6 block cipher, fingerprint recognition component 36 may analyze a set of possible classifiers to determine one that best detects presence of high-entropy fingerprints when data is encrypted by this cipher.

Some embodiments of fingerprint recognition component 36 may complement the disclosed approach via side-channel cybersecurity, e.g., by detecting and/or correlating audio in a conference room with data transmitted in a network that comprises a fingerprint (or an innocuous alteration of a fingerprint). More specifically, this additional side-channel cybersecurity may be performed if an observed packet rate of this data (which is being illicitly monitored by a microphone) is related to audio activity in the conference room, and if a device associated with the intruding microphone is transmitting the captured audio over an observable but encrypted channel. In these or other embodiments, if a side-channel leakage is known, a fingerprint could be designed to target that side-channel for leaking more easily detectable information.

Some embodiments of fingerprint recognition component 36 may determine hyperparameters of the machine learning classifier based on the particular application. In implementations where supplementary information about the application is not available, a general classifier may be implemented.

Some embodiments of fingerprint recognition component 36 may employ machine-learning algorithms to detect high-entropy (i.e., random) information in encrypted channels that utilize pseudo-random ciphering. Some embodiments of fingerprint recognition component 36 may utilize this high-entropy fingerprint in a passive manner. For example, some embodiments of fingerprint recognition component 36 facilitate a network administrator to trace movements of fingerprints through a communication network by monitoring encrypted channels and by checking for the presence of the fingerprints. Some embodiments may thus detect unwanted transfer (e.g., information leakage) and theft of the sensitive data through channels, if the fingerprint is also transferred.

Some embodiments of fingerprint recognition component 36 may operate with a higher degree of effectiveness by having pre-knowledge of a location within communicated data at which the fingerprint is inserted. For example, some implementations of end-to-end encryption may comprise data delineated by an unencrypted metadata header.

Figure 2:
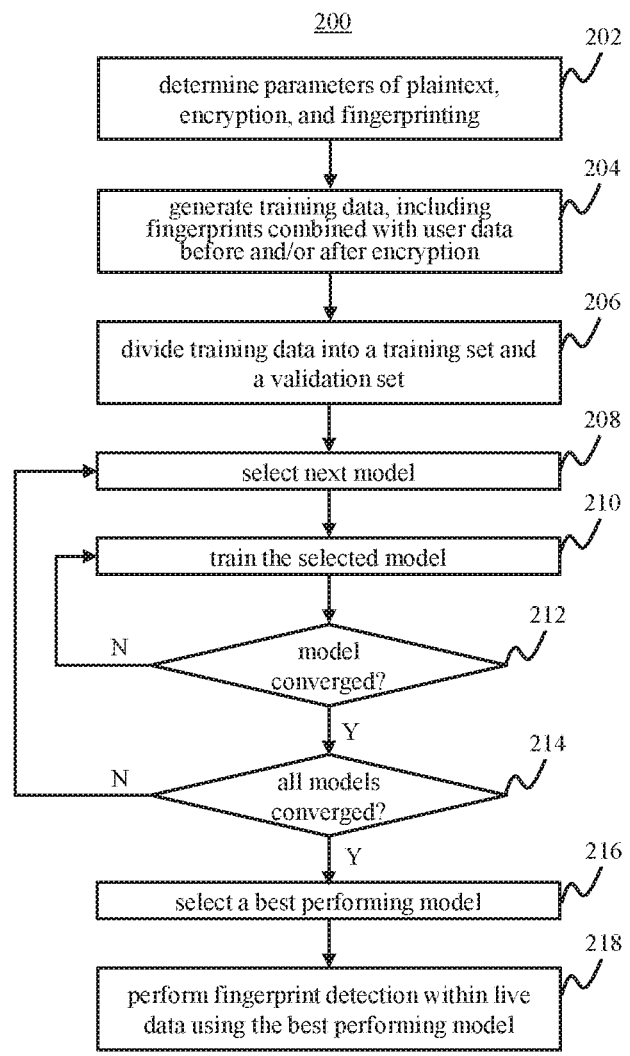
FIG. 2 illustrates a method for preparing use of a prediction model, in accordance with one or more embodiments.
Figure 3:
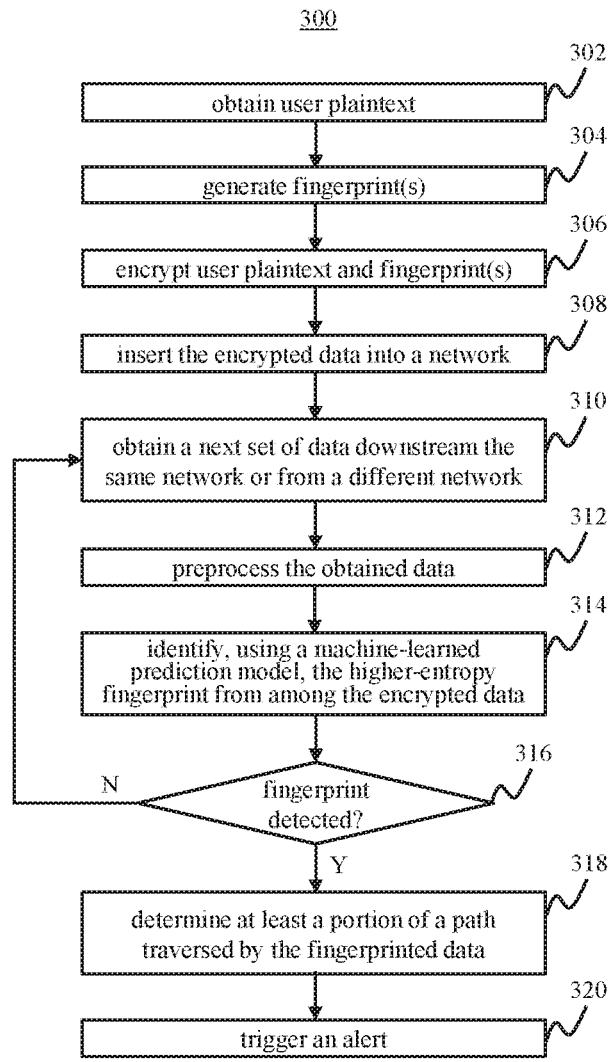
FIGS. 3-6 illustrate different methods for inserting and detecting fingerprints within encryption-protected communications, in accordance with one or more embodiments.
Figure 4:
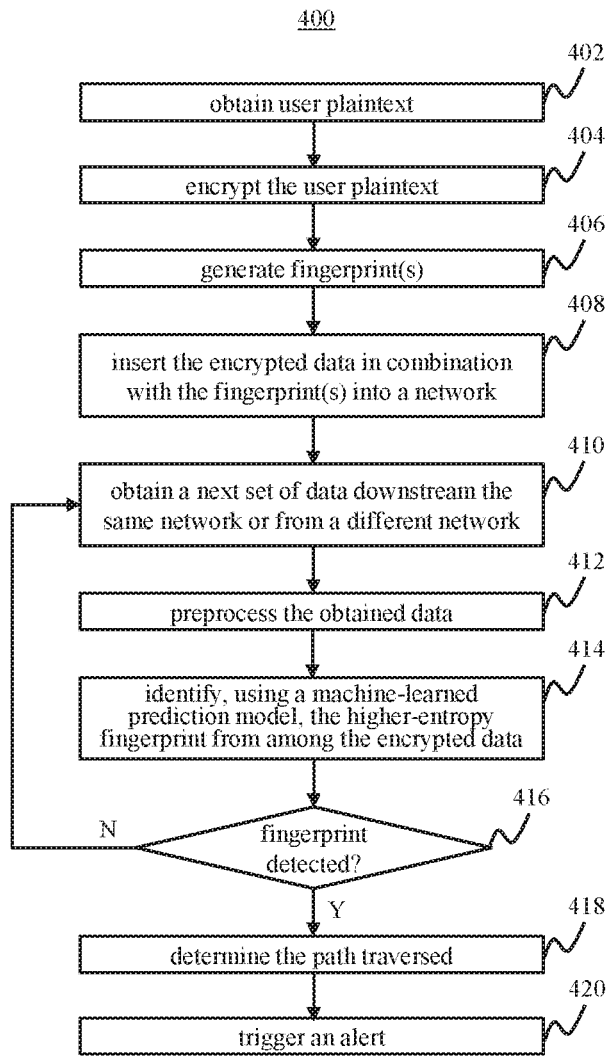
Figure 5:
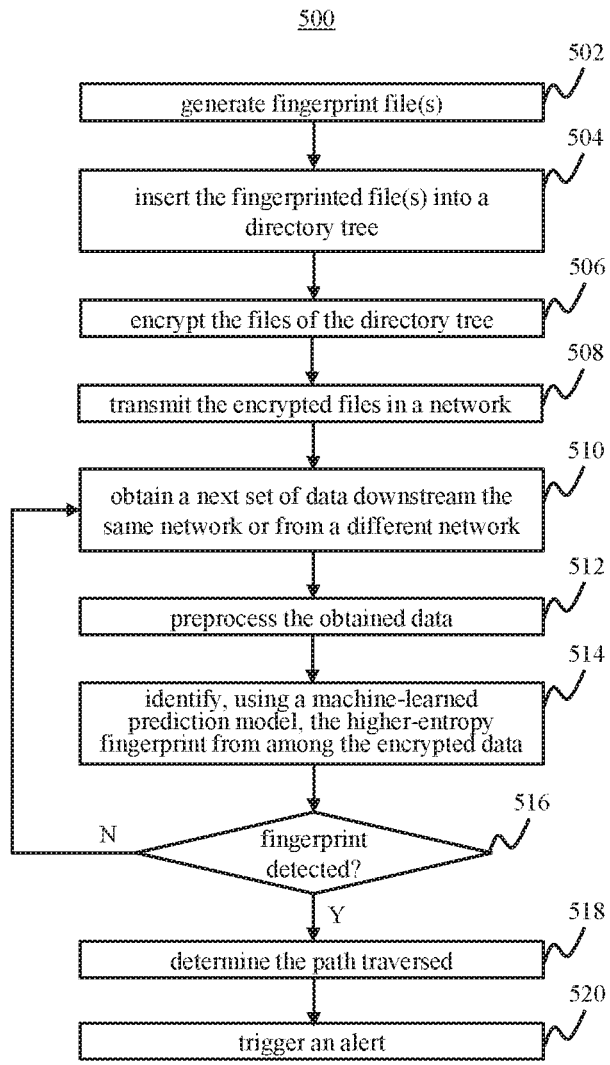
Figure 6:
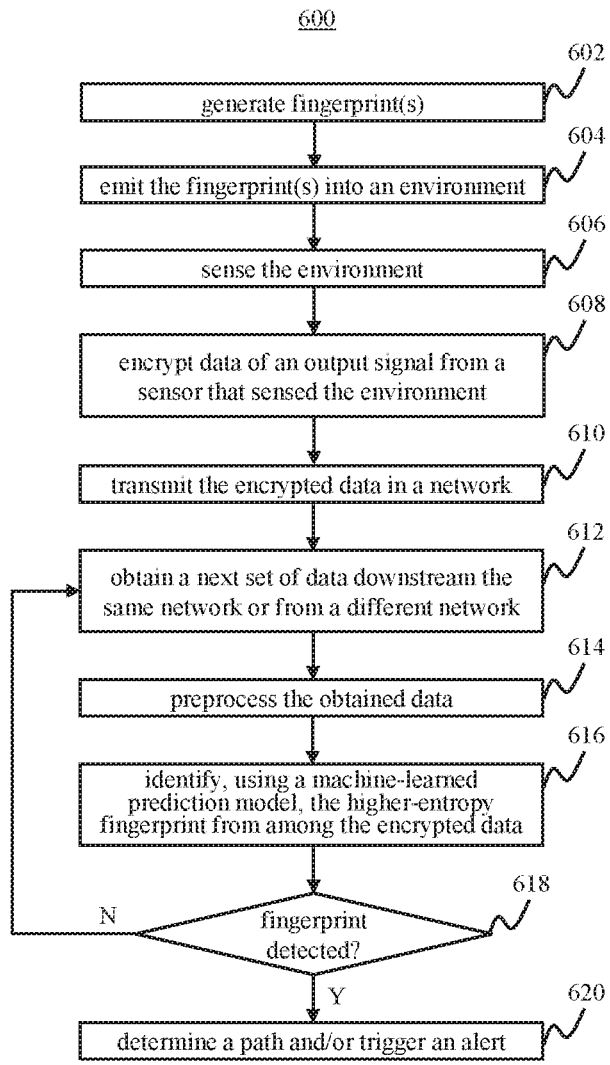

FIG. 2 illustrates method 200 for preparing, training, validating/testing, and using one or more machine-learning models for predicting high-entropy fingerprints from among ciphertext, in accordance with one or more embodiments. And FIGS. 3-6 illustrate methods 300, 400, 500, and 600 for generating and predicting presence of fingerprints from among ciphertext communicated in a channel or network, in accordance with one or more embodiments. Each of methods 200, 300, 400, 500, and 600 may be performed with a computer system comprising one or more computer processors and/or other components. The processors are configured by machine readable instructions to execute computer program components. The operations of methods 200, 300, 400, 500, and 600 presented below are intended to be illustrative. In some embodiments, methods 200, 300, 400, 500, and 600 may be accomplished with one or more additional operations not described, and/or without one or more of the operations discussed. Additionally, the order in which the operations of methods 200, 300, 400, 500, and 600 are illustrated in FIGS. 2-6 and described below is not intended to be limiting. In some embodiments, methods 200, 300, 400, 500, and 600 may each be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of methods 200, 300, 400, 500, and 600 in response to instructions stored electronically on an electronic storage medium. The processing devices may include one or more devices configured through hardware, firmware, and/or software to be specifically designed for execution of one or more of the operations of methods 200, 300, 400, 500, and 600.

At operation 202 of method 200, parameters of plaintext, encryption, and fingerprinting may be determined or identified. As an example, a formatting of the plaintext, details of the cryptographic scheming, and/or high-entropy patterns of data may be selected, identified, and/or predicted based on a particular application (e.g., cybersecurity in certain networks). In some embodiments, operation 202 is performed by a processor component the same as or similar to information component 30 (shown in FIG. 1 and described herein).

At operation 204 of method 200, training data, including fingerprints combined with user data before and/or after encryption, may be obtained and/or generated. As an example, a set of fingerprints is combined (e.g., concatenated, distributed among, etc.) with plaintext before encryption. In another example, the set of fingerprints is combined with encrypted plaintext (i.e., ciphertext). In any of these examples or in other examples, the fingerprint(s) itself (themselves) may be encrypted before and/or after the user plaintext is encrypted. In some embodiments, operation 204 is performed by a processor component the same as or similar to training component 32 (shown in FIG. 1 and described herein).

At operation 206 of method 200, training data may be divided into a training set and a validation set. As an example, the training data set may be split into training and validation datasets, in any suitable fashion. In this example or in another example, the split may further comprise a test dataset. In exemplary implementations, 80% of the training data may be used for training or validation, and the other 20% may be used for validation or testing. At least some of the training data may be labeled. In some embodiments, operation 206 is performed by a processor component the same as or similar to training component 32 (shown in FIG. 1 and described herein).

At operation 208 of method 200, one or more machine-learning prediction models may be selected. As an example, the selected model(s) may not yet have been passed any training data (e.g., including no adjustment yet of fitting parameters, such as weights of connections between neurons in artificial neural networks). In some embodiments, operation 208 is performed by a processor component the same as or similar to training component 32 (shown in FIG. 1 and described herein).

At operation 210 of method 200, the selected, machine-learning prediction model may be trained. As an example, the split training data (e.g., comprising labeled training data and unlabeled test data) may be used as inputs into the model. In some implementations, the validation data may be used to configure the hyperparameters of the model. In some embodiments, operation 210 is performed by a processor component the same as or similar to training component 32 (shown in FIG. 1 and described herein).

At operation 212 of method 200, the selected prediction model may be tested to see if it has converged. As an example, if it has, operation 214 is performed, and if it has not, operation 210 is performed again. In some implementations, model convergence implies training a model to the extent that validation results of the model are satisfactory. In some embodiments, convergence occurs once the model is sufficiently trained. And, in other embodiments, convergence occurs once the model is sufficiently validated or tested. In some embodiments, training component 32 may achieve convergence for a model, when classification errors with respect to the validation dataset are minimized. In some embodiments, the model convergence may be based on the different fingerprint generation techniques; in these or other embodiments, the model convergence may be based on different fingerprint detection techniques (e.g., different neural networks could be used). That is, some fingerprint insertion techniques may produce fingerprints that are more random than those produced by other techniques; and some fingerprint detection techniques may be better at discerning higher-entropy randomness from quasi-randomness. In some embodiments, operation 212 is performed by a processor component the same as or similar to training component 32 (shown in FIG. 1 and described herein).

At operation 214 of method 200, a test may be performed as to whether all obtained prediction models (e.g., from models database 40-2) have converged. As an example, if they have, operation 216 is performed, and if they have not, operation 208 is performed again. In some embodiments, operation 214 is performed by a processor component the same as or similar to training component 32 (shown in FIG. 1 and described herein).

At operation 216 of method 200, a best performing model may be selected. As an example, one of the models that is run may be selected that produces best results (i.e., more closely predicts accurate output data from previously unseen input data). For example, a model may be deemed best performing if, when used, it is comparatively easy to distinguish fingerprints. That is, a machine learner may be used to evaluate how easily the fingerprint is distinguished from seemingly random ciphertext. Similarly, a machine learner may be used to generate a fingerprint. In some embodiments, prediction models 40 associated with these machine learners (e.g., of fingerprint insertion component 34 and fingerprint recognition component 36) may be trained cooperatively to maximize detectability, e.g., given a cipher. In some embodiments, operation 216 is performed by a processor component the same as or similar to fingerprint insertion component 34 (shown in FIG. 1 and described herein).

At operation 218 of method 200, fingerprint detection may be performed from among live data, using the best performing model. As an example, the selected, best model may be provided ciphertext in response to which this model is used to predict presence of a high-entropy fingerprint. In some embodiments, operation 218 is performed by a processor component the same as or similar to fingerprint recognition component 36 (shown in FIG. 1 and described herein).

At operation 302 of method 300, user plaintext may be obtained. As an example, a set of user data having any desirable content to share in a communication may be received from data source 50. In another example, this set of user data may be obtained but remain at a respective data source 50. In this other example, a fingerprint may be generated and transmitted to this data source 50 before encrypting the obtained user data. And in these or other examples, the user plaintext may comprise any formatting (e.g., binary data, metadata, headers, checksums, etc.) and be obtained via any suitable method (e.g., in blocks/chunks or streaming). In some embodiments, operation 302 is performed by a processor component the same as or similar to information component 30 (shown in FIG. 1 and described herein).

At operation 304 of method 300, one or more fingerprints may be generated. As an example, each of the fingerprints may comprise a particular series of bits determined such that, upon analysis or upon undergoing a machine-learning process, differences in randomness are identifiable. In some implementations, a statistical amount of entropy is greater in the generated fingerprint than in an encrypted version of the plaintext obtained in operation 302. In some embodiments, operation 304 is performed by a processor component the same as or similar to fingerprint insertion component 34 (shown in FIG. 1 and described herein).

At operation 306 of method 300, the obtained user plaintext and the one or more generated fingerprints may be encrypted. Any encryption algorithm based on pseudo-randomness (e.g., mathematical, predetermined tables, or otherwise deterministic) may be used, for this operation. As an example, a high level or a higher level (i.e., with respect to the other encrypted plaintext) of entropy of the encrypted fingerprint(s) remains after the encryption process. In other words, a quantification of an amount of randomness of the encrypted user plaintext would be the same as or less than a quantification of an amount of randomness of the encrypted fingerprint(s). In some embodiments, the encryption may be performed by data source 50 or data sink 60, via crypto engine 55 or crypto engine 65, respectively. In other embodiments, operation 306 is performed by a processor component the same as or similar to fingerprint insertion component 34 (shown in FIG. 1 and described herein). At operation 308 of method 300, the encrypted data (e.g., ciphertext) may be inserted into a network. As an example, the encrypted user plaintext and the encrypted fingerprint(s) may be placed into a payload of one or more packets that immediately or eventually traverses network 70, network 90, and/or another accessible communication. In some embodiments, the insertion may be performed by data source 50 or data sink 60. In other embodiments, operation 308 is performed by a processor component the same as or similar to fingerprint insertion component 34 (shown in FIG. 1 and described herein).

At operation 310 of method 300, an initial or next set of data may be obtained, this data being obtained downstream the same network into which the encrypted data is inserted or being obtained from a different network. As an example, encrypted data may be snooped from a network (e.g., network 70, network 90, or another network) at any location that may be suspected (or tested) of having fingerprinted data. In some embodiments, operation 310 is performed by a processor component the same as or similar to fingerprint recognition component 36 (shown in FIG. 1 and described herein).

At operation 312 of method 300, the data obtained at operation 310 may be preprocessed. As an example, payload data may be extracted from a communication and impertinent metadata may be discarded. In some embodiments, operation 312 is performed by a processor component the same as or similar to fingerprint recognition component 36 (shown in FIG. 1 and described herein).

At operation 314 of method 300, an attempt may be performed, using a trained machine-learning prediction model, to identify high-entropy fingerprint(s) from among the encrypted data (whether preprocessed or not). As an example, a machine learner may be used to identify statistical differences between pseudo-randomness associated with encrypted user plaintext and higher-entropy randomness associated with fingerprints. In some embodiments, operation 314 is performed by a processor component the same as or similar to fingerprint recognition component 36 (shown in FIG. 1 and described herein).

At operation 316 of method 300, a test may be performed to determine whether one or more fingerprints have been detected. As an example, if a fingerprint has been detected (e.g., based on its high level of quantifiable randomness), operation 318 is performed, and if it has not, operation 310 is performed again. In some embodiments, operation 316 is performed by a processor component the same as or similar to fingerprint recognition component 36 (shown in FIG. 1 and described herein).

At operation 318 of method 300, at least a portion of a path traversed by the fingerprinted data may be determined. As an example, a path through one or more networks may be tracked, starting at least from a point in a network at which the one or more fingerprints are detected (or at a point at which the fingerprint is inserted). In this or another example, the fingerprinted data may be tracked in encrypted channel(s) all the way until it is consumed or is no longer accessible. In some embodiments, operation 318 is performed by a processor component the same as or similar to fingerprint recognition component 36 (shown in FIG. 1 and described herein).

At operation 320 of method 300, an alert to an interested user may be triggered. As an example, upon determining that an encrypted communications channel comprises fingerprinted data, a device or user may be notified. In some embodiments, operation 320 is performed by a processor component the same as or similar to fingerprint recognition component 36 (shown in FIG. 1 and described herein).

At operation 402 of method 400, user plaintext may be obtained. As an example, a set of user data having any desirable content to share in a communication may be received from data source 50. In another example, this set of user data may be obtained but remain at a respective data source 50. In this other example, a fingerprint may be generated and transmitted to this data source 50 after encrypting the obtained user data. And in these or other example, the user plaintext may comprise any formatting (e.g., binary data, metadata, headers, checksums) and be obtained via any suitable method (e.g., in blocks/chunks or streaming). In some embodiments, operation 402 is performed by a processor component the same as or similar to information component 30 (shown in FIG. 1 and described herein).

At operation 404 of method 400, the obtained user plaintext may be encrypted. Any encryption algorithm based on pseudo-randomness (e.g., mathematical, predetermined tables, or otherwise deterministic) may be used, for this operation. In some embodiments, the encryption may be performed by data source 50 or data sink 60, via crypto engine 55 or crypto engine 65, respectively. In other embodiments, operation 404 is performed by a processor component the same as or similar to fingerprint insertion component 34 (shown in FIG. 1 and described herein).

At operation 406 of method 400, one or more fingerprints may be generated. As an example, each of the fingerprints may comprise a particular series of bits determined such that, upon analysis or upon undergoing a machine-learning process, differences in randomness are identifiable. In some implementations, a statistical amount of entropy is greater in the generated fingerprint than in an encrypted version of the plaintext obtained in operation 402. In some embodiments, operation 406 is performed by a processor component the same as or similar to fingerprint insertion component 34 (shown in FIG. 1 and described herein).

At operation 408 of method 400, the encrypted data (e.g., ciphertext), in combination with a fingerprint, may be inserted into a network. As an example, the encrypted user plaintext and unencrypted fingerprint(s) may be placed into a payload of one or more packets that immediately or eventually traverses network 70, network 90, and/or another accessible communication. In some embodiments, the insertion may be performed by data source 50 (e.g., after receiving the fingerprint generated by fingerprint insertion component 34). In other embodiments, operation 408 is performed by a processor component the same as or similar to fingerprint insertion component 34 (shown in FIG. 1 and described herein).

At operation 410 of method 400, an initial or next set of data may be obtained, this data being obtained downstream the same network into which the encrypted data and fingerprint are inserted or being obtained from a different network. As an example, encrypted data may be snooped from a network at any location that may be suspected (or tested) of having fingerprinted data. In some embodiments, operation 410 is performed by a processor component the same as or similar to fingerprint recognition component 36 (shown in FIG. 1 and described herein).

At operation 412 of method 400, the data obtained at operation 410 may be preprocessed. As an example, payload data may be extracted from a communication and impertinent metadata may be discarded. In some embodiments, operation 412 is performed by a processor component the same as or similar to fingerprint recognition component 36 (shown in FIG. 1 and described herein).

At operation 414 of method 400, an attempt may be performed, using a trained machine-learning prediction model, to identify high-entropy fingerprint(s) from among the encrypted data (whether preprocessed or not). As an example, a machine learner may be used to identify statistical differences between pseudo-randomness associated with encrypted user plaintext and higher-entropy associated with fingerprints. In some embodiments, operation 414 is performed by a processor component the same as or similar to fingerprint recognition component 36 (shown in FIG. 1 and described herein).

At operation 416 of method 400, a test may be performed to determine whether one or more fingerprints have been detected. As an example, if a fingerprint has been detected (e.g., based on its high level of quantifiable randomness), operation 418 is performed, and if it has not, operation 410 is performed again. In some embodiments, operation 416 is performed by a processor component the same as or similar to fingerprint recognition component 36 (shown in FIG. 1 and described herein).

At operation 418 of method 400, at least a portion of a path traversed by the fingerprinted data may be determined. As an example, a path through one or more networks may be tracked, starting at least from a point in a network at which the one or more fingerprints are detected (or at a point at which the fingerprint is inserted). In this or another example, the fingerprinted data may be tracked in encrypted channel(s) all the way until it is consumed or is no longer accessible. In some embodiments, operation 418 is performed by a processor component the same as or similar to fingerprint recognition component 36 (shown in FIG. 1 and described herein).

At operation 420 of method 400, an alert to an interested user may be triggered. As an example, upon determining that an encrypted communications channel comprises fingerprinted data, a device or user may be notified. In some embodiments, operation 420 is performed by a processor component the same as or similar to fingerprint recognition component 36 (shown in FIG. 1 and described herein).

At operation 502 of method 500, one or more fingerprints may be generated in the form of a computer file (e.g., of any suitable file extension). As an example, each of the fingerprints may comprise a particular series of bits determined such that, upon analysis or upon undergoing a machine-learning process, differences in randomness are identifiable. In this or another example, the fingerprint file may be invisible (i.e., hidden) in a file explorer or via a terminal prompt. In some embodiments, operation 502 is performed by a processor component the same as or similar to fingerprint insertion component 34 (shown in FIG. 1 and described herein).

At operation 504 of method 500, the fingerprinted file(s) may be inserted into a directory tree of a data storage drive. As an example, the fingerprint file may be placed in one folder or distributed among several folders. In some embodiments, operation 504 is performed by a processor component the same as or similar to fingerprint insertion component 34 (shown in FIG. 1 and described herein).

At operation 506 of method 500, computer files in one or more folders (e.g., of a directory tree), including the fingerprint file(s), may be obtained and encrypted. Any encryption algorithm based on pseudo-randomness (e.g., mathematical, predetermined tables, or otherwise deterministic) may be used, for this operation. In some embodiments, the encryption may be performed by data source 50 or data sink 60, via crypto engine 55 or crypto engine 65, respectively. In other embodiments, operation 506 is performed by a processor component the same as or similar to fingerprint insertion component 34 (shown in FIG. 1 and described herein).

At operation 508 of method 500, the encrypted files may be inserted into a network. As an example, encrypted data representing an encrypted version of the files obtained at operation 506 may be transmitted either immediately or eventually through network 70, network 90, and/or another accessible communication. In some embodiments, the insertion may be performed by, data source 50 (e.g., after receiving the fingerprint file(s) from fingerprint insertion component 34). In other embodiments, operation 508 is performed by a processor component the same as or similar to fingerprint insertion component 34 (shown in FIG. 1 and described herein).

At operation 510 of method 500, an initial or next set of data may be obtained, this data being obtained downstream the same network into which the encrypted files are inserted or being obtained from a different network. As an example, encrypted traffic may be snooped from a network (e.g., network 70, network 90, or another network) at any location that may be suspected (or tested) of having fingerprinted files. In some embodiments, operation 510 is performed by a processor component the same as or similar to fingerprint recognition component 36 (shown in FIG. 1 and described herein).

At operation 512 of method 500, the data obtained at operation 510 may be preprocessed. As an example, payload data may be extracted from a communication and impertinent metadata may be discarded. In some embodiments, operation 512 is performed by a processor component the same as or similar to fingerprint recognition component 36 (shown in FIG. 1 and described herein).

At operation 514 of method 500, an attempt may be performed, using a trained machine-learning prediction model, to identify high-entropy fingerprint file(s) from among the encrypted data (whether preprocessed or not). As an example, a machine learner may be used to identify statistical differences between higher-entropy randomness associated with encrypted fingerprint files and pseudo-randomness associated with the other encrypted files. In some embodiments, operation 514 is performed by a processor component the same as or similar to fingerprint recognition component 36 (shown in FIG. 1 and described herein).

At operation 516 of method 500, a test may be performed to determine whether one or more fingerprint files have been detected. As an example, if a fingerprint file has been detected (e.g., based on its high level of quantifiable randomness), operation 518 is performed, and if it has not, operation 510 is performed again. In some embodiments, operation 516 is performed by a processor component the same as or similar to fingerprint recognition component 36 (shown in FIG. 1 and described herein).

At operation 518 of method 500, at least a portion of a path traversed by the fingerprinted file may be determined. As an example, a path through one or more networks may be tracked, starting at least from a point in a network at which the one or more fingerprint files are detected (or at a point at which the fingerprint file is inserted). In this or another example, the fingerprinted file may be tracked in encrypted channel(s) all the way until it is consumed or is no longer accessible. In some embodiments, operation 518 is performed by a processor component the same as or similar to fingerprint recognition component 36 (shown in FIG. 1 and described herein).

At operation 520 of method 500, an alert to an interested user may be triggered. As an example, upon determining that an encrypted communications channel comprises a fingerprinted file, a device or user may be notified. In some embodiments, operation 520 is performed by a processor component the same as or similar to fingerprint recognition component 36 (shown in FIG. 1 and described herein).

At operation 602 of method 600, one or more fingerprints may be generated. As an example, each of the fingerprints may comprise a particular sequence, pattern, or waveform such that, upon analysis or upon undergoing a machine-learning process, differences in randomness may be identifiable when encountered among encrypted traffic. In some embodiments, operation 602 is performed by a processor component the same as or similar to fingerprint insertion component 34 (shown in FIG. 1 and described herein).

At operation 604 of method 600, the fingerprint(s) may be emitted into an environment where sensitive information is exchanged. As an example, the generated fingerprint(s) may be forwarded to transmitter 45, and transmitter 45 may then inject the fingerprint into a meeting space within which a secret conversation or presentation is taking place. In this or another example, the fingerprint emission may be performed auditorily with a horn, electroacoustic transducer, etc., or visually with an infrared transmitter or a laser. In some embodiments, operation 604 is performed by transmitter 45 alone or in conjunction with a processor component the same as or similar to fingerprint insertion component 34 (shown in FIG. 1 and described herein).

At operation 606 of method 600, the environment may be sensed. As an example, a microphone and/or camera may be used to attack the secret meeting space. In some embodiments, operation 606 is performed by sensor(s) 95 (shown in FIG. 1 and described herein).

At operation 608 of method 600, data of one or more output signals from sensor(s) that sensed the environment may be encrypted. Any encryption algorithm based on pseudo-randomness (e.g., mathematical, predetermined tables, or otherwise deterministic) may be used, for this operation. In some embodiments, the encryption may be performed by data sink 60, via crypto engine 65 (shown in FIG. 1 and described herein).

At operation 610 of method 600, the encrypted data may be inserted into a network. As an example, the encrypted data may be transmitted either immediately or eventually through network 70, network 90, and/or another accessible communication. In some embodiments, the insertion may be performed by data sink 60.

At operation 612 of method 600, an initial or next set of data may be obtained, this data being obtained downstream the same network into which the encrypted data is inserted or being obtained from a different network. As an example, encrypted traffic may be snooped from a network (e.g., network 70, network 90, or another network) at any location that may be suspected (or tested) of having fingerprinted files. In some embodiments, operation 612 is performed by a processor component the same as or similar to fingerprint recognition component 36 (shown in FIG. 1 and described herein).

At operation 614 of method 600, the data obtained at operation 612 may be preprocessed. As an example, payload data may be extracted from a communication and impertinent metadata may be discarded. In some embodiments, operation 614 is performed by a processor component the same as or similar to fingerprint recognition component 36 (shown in FIG. 1 and described herein).

At operation 616 of method 600, an attempt may be performed, using a trained machine-learning prediction model, to identify high-entropy fingerprint file(s) from among the encrypted data (whether preprocessed or not). As an example, a machine learner may be used to identify statistical differences between high-entropy randomness associated with encrypted fingerprint(s) and pseudo-randomness associated with the other encrypted data. In some embodiments, operation 616 is performed by a processor component the same as or similar to fingerprint recognition component 36 (shown in FIG. 1 and described herein).

At operation 618 of method 600, a test may be performed to determine whether one or more fingerprint(s) have been detected. As an example, if a fingerprint has been detected (e.g., based on its high level of quantifiable randomness), operation 620 is performed, and if it has not, operation 612 is performed again. In some embodiments, operation 618 is performed by a processor component the same as or similar to fingerprint recognition component 36 (shown in FIG. 1 and described herein).

At operation 620 of method 600, at least a portion of a path traversed by the fingerprinted information may be determined; further, an alert to an interested user may be triggered. As an example, a path through one or more networks may be tracked, starting at least from a point in a network at which the one or more fingerprints are detected (or at a point at which the fingerprint is inserted). In this or another example, the fingerprint may be tracked in encrypted channel(s) all the way until it is consumed or is no longer accessible. Upon determining that an encrypted communications channel comprises one or more fingerprints, a device or user may be notified, in some implementations. In some embodiments, operation 620 is performed by a processor component the same as or similar to fingerprint recognition component 36 (shown in FIG. 1 and described herein).

Techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module; component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Several embodiments of the invention are specifically illustrated and/or described herein. However, it will be appreciated that modifications and variations are contemplated and within the purview of the appended claims.

What is claimed is:

1. A computer-implemented method comprising:
generating a data set configured to have a first amount of entropy;
before cryptographic encryption of user data, combining the user data with the generated data set;
obtaining, from a network, (i) a first ciphertext resulting from cryptographic encryption of the combined data and (ii) a plurality of second ciphertexts located in the network;
determining, via a machine learner, an entropy level of the first ciphertext;
determining, via the machine learner, an entropy level of each of the plurality of second ciphertexts;
determining, via the machine learner, whether the entropy level of the first ciphertext is greater than the entropy level of each of the second ciphertexts;
responsive to the determination that the first ciphertext has the greater amount of entropy, identifying a portion of the network traversed by the first ciphertext; and
outputting, to a user remote from the network, the portion.

2. The computer-implemented method of claim 1, wherein the determination is based on a classifier that implements at least one of a clustering analysis, support vector machine (SVM), linear discriminant analysis, time frequency pattern analysis, singular value decomposition (SVD), artificial neural network, deep neural network (DNN), recurrent neural network (RNN), convolutional neural network (CNN), hidden Markov model (HMM), and Bayesian network (BN).

3. The computer-implemented method of claim 1, wherein the combination comprises concatenating the data set with the user data.

4. The computer-implemented method of claim 1, wherein the user data is a portion of a message being communicated over the network.

5. The computer-implemented method of claim 1, wherein the user data and the data set are separate files stored in at least one database.

6. The computer-implemented method of claim 1, further comprising:
identifying a second portion of a second network through which the first ciphertext is detected to traverse, the second network being different from the network.

7. The computer-implemented method of claim 1, wherein the identified portion forms part of a route established from a node of the network, to another node of a second, different network, and
wherein the user data is encrypted within the node.

8. The computer-implemented method of claim 1, wherein the identified portion is an entire path starting from a node in the network at which the data set is combined with the user data, the entire path ending at another node in the network or in another network at which the user data is consumed.

9. The computer-implemented method of claim 1, wherein the combination is performed on demand by the user.

* * * * *